United States Patent
Hansen et al.

(10) Patent No.: US 9,991,714 B2
(45) Date of Patent: Jun. 5, 2018

(54) OPPOSING CONTACTORS FOR ENERGY STORAGE DEVICE ISOLATION

(71) Applicant: General Electric Company, Schenectady, NY (US)

(72) Inventors: Lukas Mercer Hansen, Niskayuna, NY (US); Kenneth Lamar Barfield, Glenville, NY (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 14/830,847

(22) Filed: Aug. 20, 2015

(65) Prior Publication Data

US 2017/0054295 A1 Feb. 23, 2017

(51) Int. Cl.
*H02J 3/38* (2006.01)
*H02M 3/04* (2006.01)
*H02M 7/44* (2006.01)

(52) U.S. Cl.
CPC .............. *H02J 3/382* (2013.01); *H02J 3/383* (2013.01); *H02J 3/386* (2013.01)

(58) Field of Classification Search
None
See application file for complete search history.

(56) References Cited

U.S. PATENT DOCUMENTS

| | | | | |
|---|---|---|---|---|
| 2014/0362628 A1* | 12/2014 | Eckel | ................... | H02M 7/483 363/132 |
| 2014/0369094 A1* | 12/2014 | Hosini | .................... | H02M 7/49 363/50 |
| 2015/0044521 A1* | 2/2015 | Camp | ................... | H02J 7/0018 429/50 |
| 2015/0329006 A1* | 11/2015 | Burkman | .............. | B60L 11/123 307/10.7 |
| 2016/0035509 A1* | 2/2016 | Johansson | ............ | H01H 33/596 218/145 |

* cited by examiner

*Primary Examiner* — Jared Fureman
*Assistant Examiner* — Aqeel Bukhari
(74) *Attorney, Agent, or Firm* — Dority & Manning, P.A.

(57) ABSTRACT

An energy storage system can include an energy storage device, such as a battery energy storage device, having a first terminal and a second terminal. A first unidirectional contactor can be coupled to the first terminal. A second unidirectional contactor can be coupled to the second terminal. The first unidirectional contactor can be coupled to the energy storage device with opposite polarity relative to the second unidirectional contactor. The first unidirectional contactor and the second unidirectional contactor can be controlled based on direction of current flow associated with the energy storage device.

19 Claims, 5 Drawing Sheets

OPPOSING CONTACTORS FOR ENERGY STORAGE DEVICE ISOLATION

FIELD OF THE INVENTION

The present subject matter relates generally to energy storage systems and more particularly, to contactor arrangements for energy storage devices in energy storage systems.

BACKGROUND OF THE INVENTION

Energy storage systems (e.g., battery energy storage systems) have become increasingly used to deliver power either as part of standalone energy storage systems or as part of a power generation systems (e.g., a wind farm, solar farm, gas turbine system) with an integrated energy storage system. Energy storage systems can include one or more battery banks or other energy storage devices that can be coupled to the grid via a suitable power converter. In some implementations, an energy storage system can include a plurality of energy storage devices. Each energy storage device can be coupled to a power converter or other component of the energy storage system through a contactor. The contactor can be opened and closed to deliver current to or receive current from the energy storage device.

Direct current (DC) contactors typically used with energy storage systems can be unidirectional contactors designed to accommodate opening with current flowing in one direction. For instance, example contactors can make use of magnets and other components to suppress plasma arcs formed between contactor plates of the contactor as the contactor is opened. When current flows in an opposite direction across the unidirectional contactor, debris can build up between the contactor plates as a result of plasma arcs, leading to shorter life of the contactor.

Energy storage devices need to accommodate current flow both to the energy storage device and from the energy storage device during, for instance, charging and discharging of the energy storage device. As a result, contactor life of unidirectional contactors can become an issue when operating the contactors in the energy storage system. Bidirectional contactors can be used to accommodate opening with current flow in multiple directions. However, the use of bidirectional contactors to can lead to increased expense.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to an energy storage system. The energy storage system includes at least one energy storage device having a first terminal and a second terminal. A first unidirectional contactor can be coupled to the first terminal. A second unidirectional contactor can be coupled to the second terminal. The first unidirectional contactor can be coupled to the energy storage device with opposite polarity relative to the second unidirectional contactor.

Another example aspect of the present disclosure is directed to a method for controlling a plurality of contactors in an energy storage system having a first unidirectional contactor coupled to a first terminal of an energy storage device and a second unidirectional contactor coupled to a second terminal of the energy storage device. The first unidirectional contactor can be coupled to the energy storage device with opposite polarity relative to the second unidirectional contactor. The method can include determining an isolating condition for the energy storage device; determining a direction of current flow associated with the energy storage device; and controlling the opening of the first unidirectional contactor and the second unidirectional contactor based at least in part on the direction of current flow associated with the energy storage device.

Yet another example aspect of the present disclosure is directed to a control system for controlling a plurality of contactors in an energy storage system having a first unidirectional contactor coupled to a first terminal of an energy storage device and a second unidirectional contactor coupled to a second terminal of the energy storage device. The first unidirectional contactor can be coupled to the energy storage device with opposite polarity relative to the second unidirectional contactor. The control system can include a contactor drive circuit configured to open and close the first unidirectional contactor and the second unidirectional contactor. The control system can further include at least one sensor configured to determine the direction of current flow associated with the at least one energy storage device. The control system can further include one or more control devices configured to provide a contactor command to the contactor drive circuit based at least in part on the direction of current flow associated with the at least one energy storage device. The contactor command can control the contactor drive circuit to open at least one of the first unidirectional contactor or the second unidirectional contactor.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
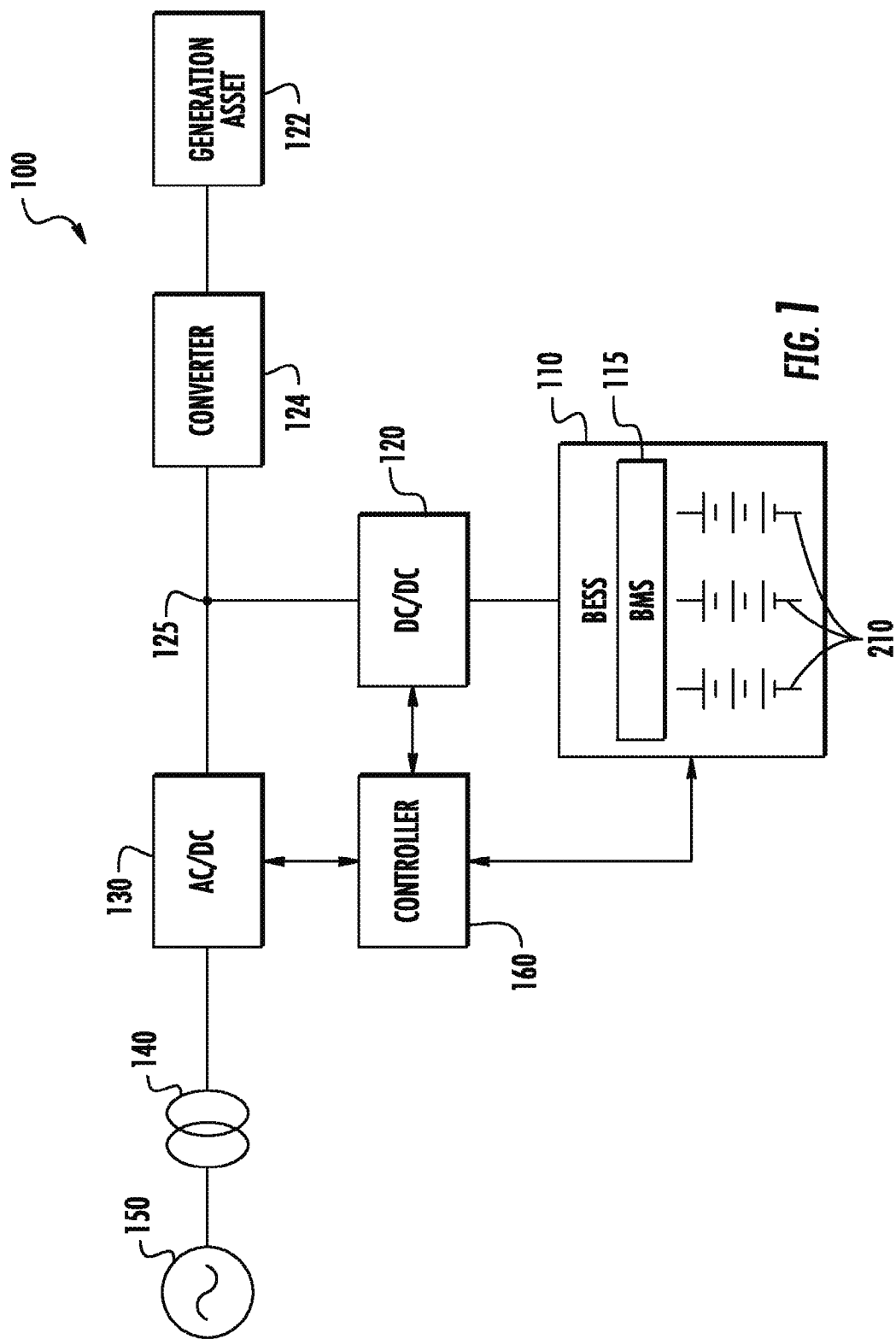
FIG. 1 depicts an example energy storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to use of unidirectional contactors in conjunction with energy storage devices in an energy storage system. More particularly, an energy storage system can include an energy storage device, such as a battery energy storage device, having a first terminal and a second terminal. A first unidirectional contactor can be coupled to the first terminal. A second unidirectional contactor can be coupled to the second terminal. The first unidirectional contactor and the second unidirectional contactor can be designed to accommodate opening with current flow in a single direction.

According to example embodiments of the present disclosure, the first unidirectional contactor can be coupled to the energy storage device with opposite polarity relative to the second unidirectional contactor. For instance, in one implementation, the first unidirectional contactor is coupled to the first terminal such that the first unidirectional contactor has a first polarity and the second unidirectional contactor is coupled to the second terminal such that the second unidirectional contactor has a second polarity. The second polarity can be different from the first polarity. For instance, the first polarity can correspond to current flowing in a first direction (e.g., a current flow direction associated with charging the energy storage device) and the second polarity can correspond to current flowing in a second direction (e.g., a current flow direction associated with discharging the energy storage device).

In one embodiment, the energy storage system can include a control system. The control system can be configured to operate the first unidirectional contactor and the second unidirectional contactor based at least in part on a direction of current flow associated with the energy storage device. For instance, in one example, the control system can be configured to first open the first unidirectional contactor and to subsequently open the second unidirectional contactor to isolate the energy storage device when the control system determines that current is flowing in the first direction. When the current is flowing in the second direction, the control system can first open the second unidirectional contactor and subsequently open the first unidirectional contactor to isolate the energy storage device.

In this way, example aspects of the present disclosure can have a technical effect of allowing unidirectional contactors to be used in conjunction with energy storage devices without requiring the opening of contactors with currents flowing in a direction not intended to be accommodated by the contactors. As a result, life and durability of the contactors can be increased without having to incur the additional expense of bidirectional contactors.

With reference now to the Figures, example embodiments of the present disclosure will now be discussed in detail. FIG. 1 depicts an example power system 100 that includes an energy storage system 110 according to example aspects of the present disclosure. The power system 100 can be a standalone power generation system or can be implemented as part of a power generation system, such as wind farm, solar farm, gas turbine generation system or other power generation system.

The power system 100 can include a battery energy storage system (BESS) 110. The BESS 110 can include one or more battery energy storage devices 210, such as battery cells or battery packs. The battery energy storage devices 210 can contain one or more sodium nickel chloride batteries, sodium sulfur batteries, lithium ion batteries, nickel metal hydride batteries, or other similar devices. Each of the energy storage devices 210 can be coupled to the power system 100 via one or more contactors. The present disclosure is discussed with reference to a battery energy storage system for purposes of illustration and discussion, those of ordinary skill in the art, using the disclosures provided herein, should understand that other energy storage devices (e.g. capacitors, fuel cells, etc.) can be used without deviating from the scope of the present disclosure.

The BESS 110 can include a battery management system (BMS) 115. The BMS 115 can include one or more electronic devices that monitor one or more of the battery energy storage devices 210, such as by protecting the battery energy storage device from operating outside a safe operating mode, monitoring a state of charge of the battery energy storage device, calculating and reporting operating data for the battery energy storage device, controlling the battery energy storage device environment, and/or any other suitable control actions. For example, in several embodiments, the BMS 115 is configured to monitor and/or control operation of one or more energy storage devices 210. The BMS 115 can be, for example, a logic controller implemented purely in hardware, a firmware-programmable digital signal processor, or a programmable processor-based software-controlled computer.

The BESS 110 can be coupled to a DC to DC converter 120. The DC to DC converter 120 can be a buck converter, boost converter, or buck/boost converter. The DC to DC converter 120 can convert a DC voltage at the DC bus 125 to a suitable DC voltage for providing power to or receiving power from the BESS 110. The DC bus 125 can be a standalone DC bus between the DC to DC converter 120 and the inverter 130.

Alternatively, the DC bus 125 can be a DC bus of a two-stage power converter used to convert energy from a power generation source to suitable power for the AC grid 150. For instance, as shown in FIG. 1, the DC bus is coupled to a converter 124 (e.g., a DC to DC converter or AC to DC converter), which receives power from a generation asset 122, such as a wind turbine, photovoltaic array, gas turbine, or other suitable power generation asset.

The DC to DC converter can include one or more electronic switching elements, such as insulated gate bipolar transistors (IGBT). The electronic switching elements can be controlled (e.g. using pulse width modulation) to charge or to discharge the battery energy storage system 110. In addition, the electronic switching elements can be controlled to condition DC power received or provided to the BESS 115.

The power system can further include an inverter 130. The inverter 130 can be configured to convert DC power on the DC bus 125 to suitable AC power for application to utility grid 150 (e.g. 50 Hz or 60 Hz AC power). The inverter 130 can include one or more electronic switching elements, such as IGBTs. The electronic switching elements can be controlled (e.g. using pulse width modulation) to convert the DC power on the DC bus to suitable AC power for the grid 150. The inverter 130 can provide AC power to the grid 150 through a suitable transformer 140 and various other devices, such as switches, relays, contactors, etc. used for protection of the power system 100.

The power system 100 can also include a controller 160 that is configured to monitor and/or control various aspects of the power system 100. In accordance with various embodiments, the controller 160 can be a separate unit (as shown) or can be part of the BMS 115 of the BESS 110.

Figure 2:
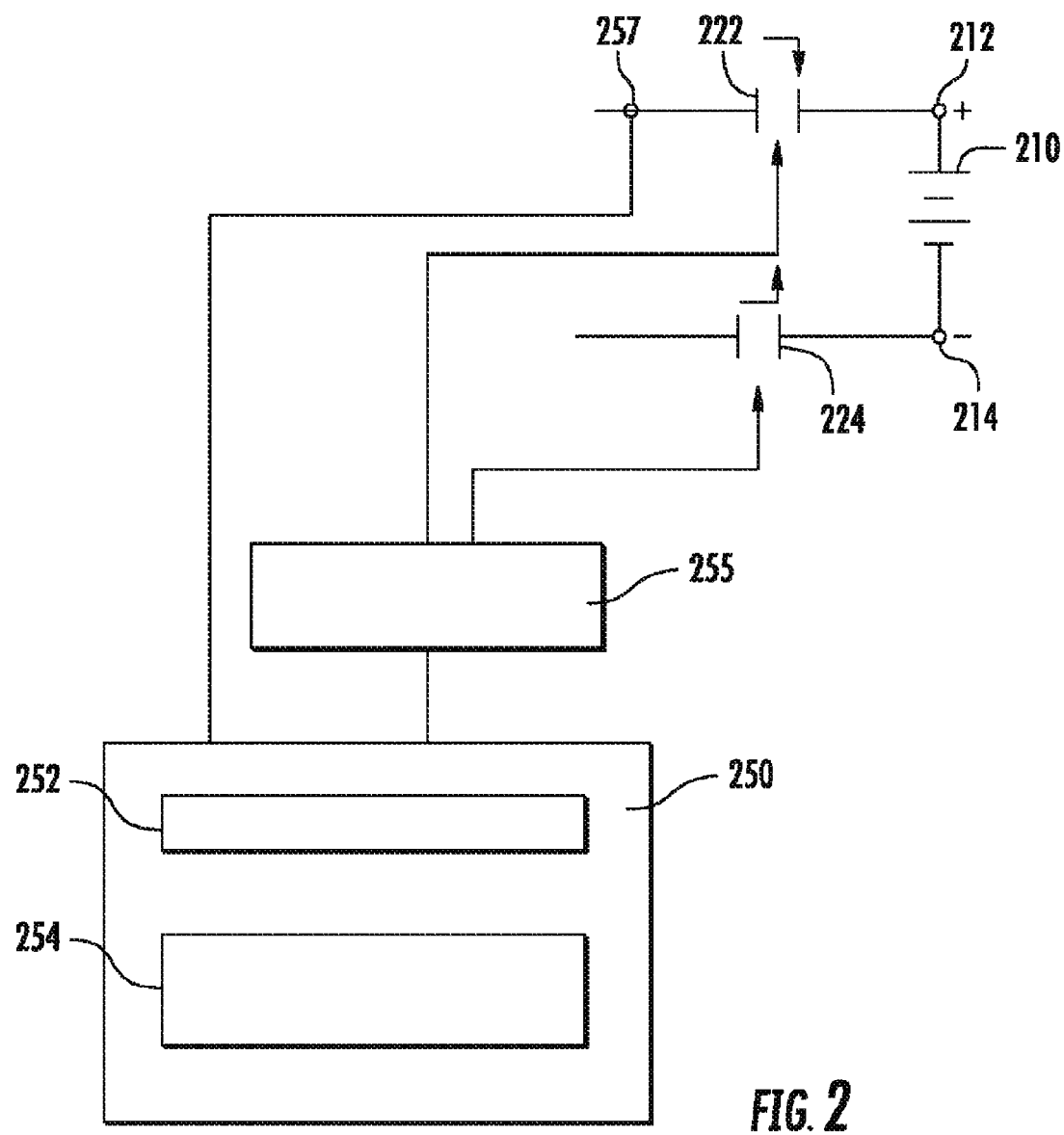
FIG. 2 depicts an example contactor arrangement according to example embodiments of the present disclosure.

FIG. 2 depicts example contactor arrangement for coupling and decoupling an energy storage device 110 to the power system 100 according to example embodiments of the present disclosure. As shown, the battery energy storage device 210 includes a first terminal 212 (e.g., a positive terminal) and a second terminal 214 (e.g., a negative terminal). A first direct current (DC) unidirectional contactor 222 can be coupled to the first terminal 212. A second direct current (DC) unidirectional contactor 224 can be coupled to the second terminal. The first unidirectional contactor 222 and the second unidirectional contactor 224 can be designed to accommodate opening with current flow in one direction. In particular implementations, the first unidirectional contactor 222 and the second unidirectional contactor can be LEV200 series contactors manufactured by Tyco, GX series contactors manufactured by Gigavac, or other suitable contactors.

As shown in FIG. 2, the first unidirectional contactor 222 can be coupled to the energy storage device 210 in a manner associated with a first polarity. The first polarity can correspond to current flowing to the positive terminal of the energy storage device (e.g., during charging of the energy storage device). The second unidirectional contactor 224 can be coupled to the energy storage device 210 in a manner having a second polarity. The second polarity can correspond to current flowing from the positive terminal of the energy storage device (e.g., during discharging of the energy storage device). In other embodiments, the first polarity can correspond to current flowing from the positive terminal of the energy storage device 210 and the second polarity can correspond to current flowing to the energy storage device 210.

As shown, the first unidirectional contactor 222 and the second unidirectional contactor 224 can receive commands from a control system used to control operation of the first unidirectional contactor 222 and the second unidirectional contactor 223. The control system can be, can be part of or can include a BMS, a power system controller, or other suitable control system associated with an energy storage system.

In one embodiment, the control system can include a contactor drive circuit 255 configured to provide contactor commands to the first unidirectional contactor 222 and the second unidirectional contactor 224. The contactor commands can control operation (e.g., opening and closing) of the first unidirectional contactor 222 and the second unidirectional contactor 224.

The control system can further include a sensor 257 configured to determine a direction of current flow associated with the energy storage device 212. For instance, in one embodiment, the sensor 257 can determine when current is flowing to the first terminal 212 of the energy storage device 210. The sensor 257 can also determine when current is flowing from the first terminal 212 of the energy storage device 210. The sensor 257 can be a current sensor or other suitable circuit or device used to determine a direction of current flow associated with the energy storage device 210.

The control system can include one or more control devices 250 configured to control operation of the first unidirectional contactor 222 and the second unidirectional contactor 224 based at least in part on the direction of current flow. The one or more control devices 250 can include the BMS, power system controller, or other suitable control devices. In one implementation, the one or more control devices 250 can include one or more processors 252 and one or more memory devices 254. The one or more memory devices can store computer-readable instructions that when executed by the one or more processors 252 cause the one or more control devices to implement control routines according to example embodiments of the present disclosure.

As used herein, the term "processor" 252 refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 254 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements.

Figure 3A:
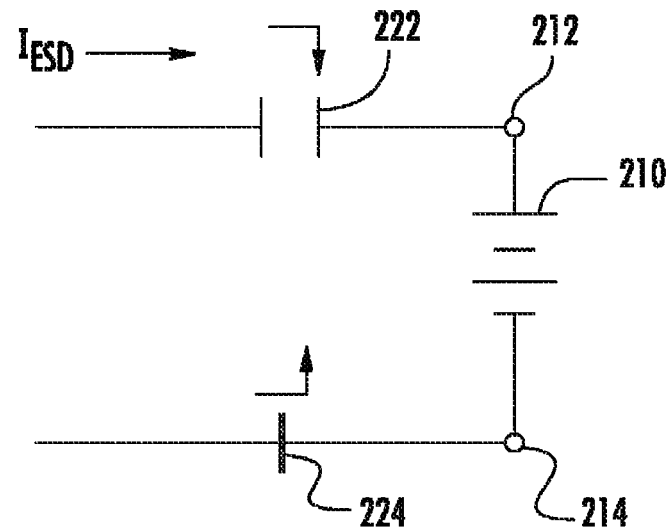
FIGS. 3(a) and 3(b) depict example operation of contactors according to an example embodiment of the present disclosure.
Figure 3B:
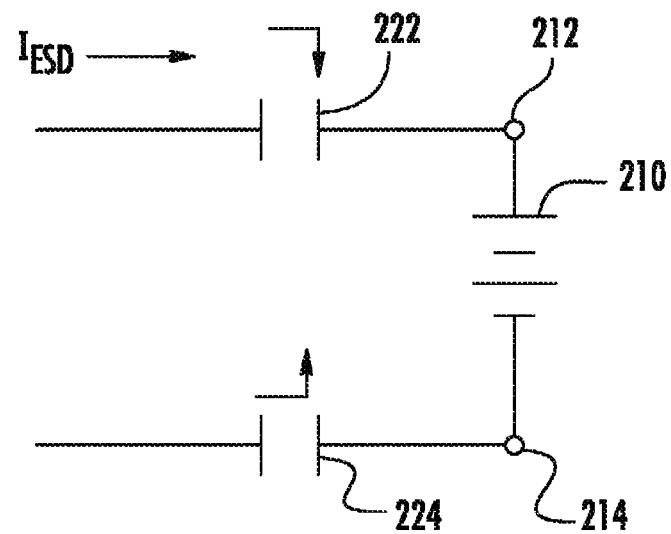

FIGS. 3(*a*) and 3(*b*) depict the example operation of the first unidirectional contactor 222 and the second unidirectional contactor 224 to isolate the energy storage device 210 from the power system according to an example embodiment of the present disclosure. As shown in FIG. 3(*a*), when a current $I_{ESD}$ associated with the energy storage device 210 is determined to be flowing to the first terminal 212 of the energy storage device 210, the control system can send a contactor command to open the first unidirectional contactor 222 while the second unidirectional contactor 224 remains closed. The first unidirectional contactor 222 can have a polarity to accommodate opening while current is flowing to the first terminal 212.

After the first unidirectional contactor 222 has opened, the control system can send a contactor command to the subsequently open the second unidirectional contactor 224. For instance, after a period of time (e.g., a predetermined period of time), the control system can send a contactor command to open the second unidirectional contactor 224 to isolate the energy storage device 210 from the power system. In this way, the second unidirectional contactor 224 can be opened without current flowing in the second unidirectional contactor 224, leading to increased contactor life.

Figure 4A:
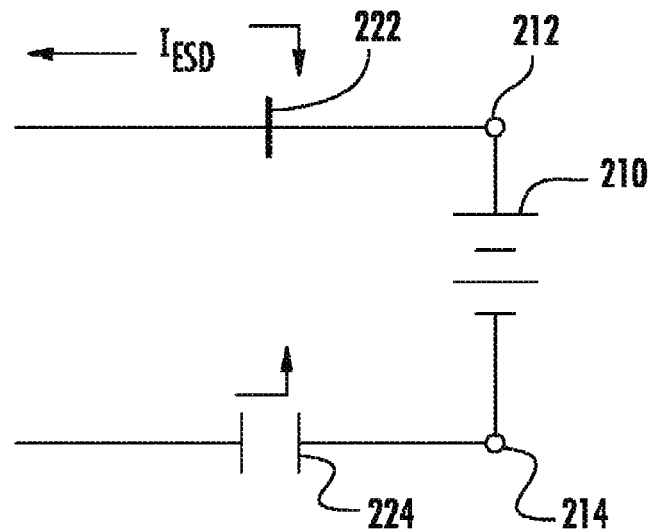
FIGS. 4(a) and 4(b) depict example operation of contactors according to an example embodiment of the present disclosure.
Figure 4B:
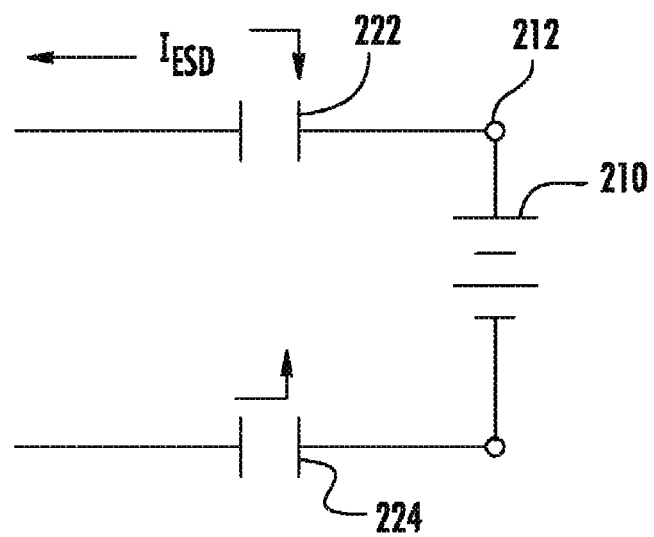

FIGS. 4(*a*) and 4(*b*) depict the example operation of the first unidirectional contactor 222 and the second unidirectional contactor 224 to isolate the energy storage device 210 from the power system according to an example embodiment of the present disclosure. As shown in FIG. 4(*a*), when a current $I_{ESD}$ associated with the energy storage device 210 is determined to be flowing from the first terminal 212 of the energy storage device 210, the control system can send a contactor command to open the second unidirectional contactor 224 while the first unidirectional contactor 222 remains closed. The second unidirectional contactor 224 can have a polarity to accommodate opening while current is flowing from the first terminal 212.

After the second unidirectional contactor 224 has opened, the control system can send a contactor command to the subsequently open the first unidirectional contactor 222. For instance, after a period of time (e.g., a predetermined period of time), the control system can send a contactor command to open the first unidirectional contactor 222 to isolate the energy storage device 210 from the power system. In this way, the first unidirectional contactor 222 can be opened without current flowing in the first unidirectional contactor 222, leading to increased contactor life.

Figure 5:
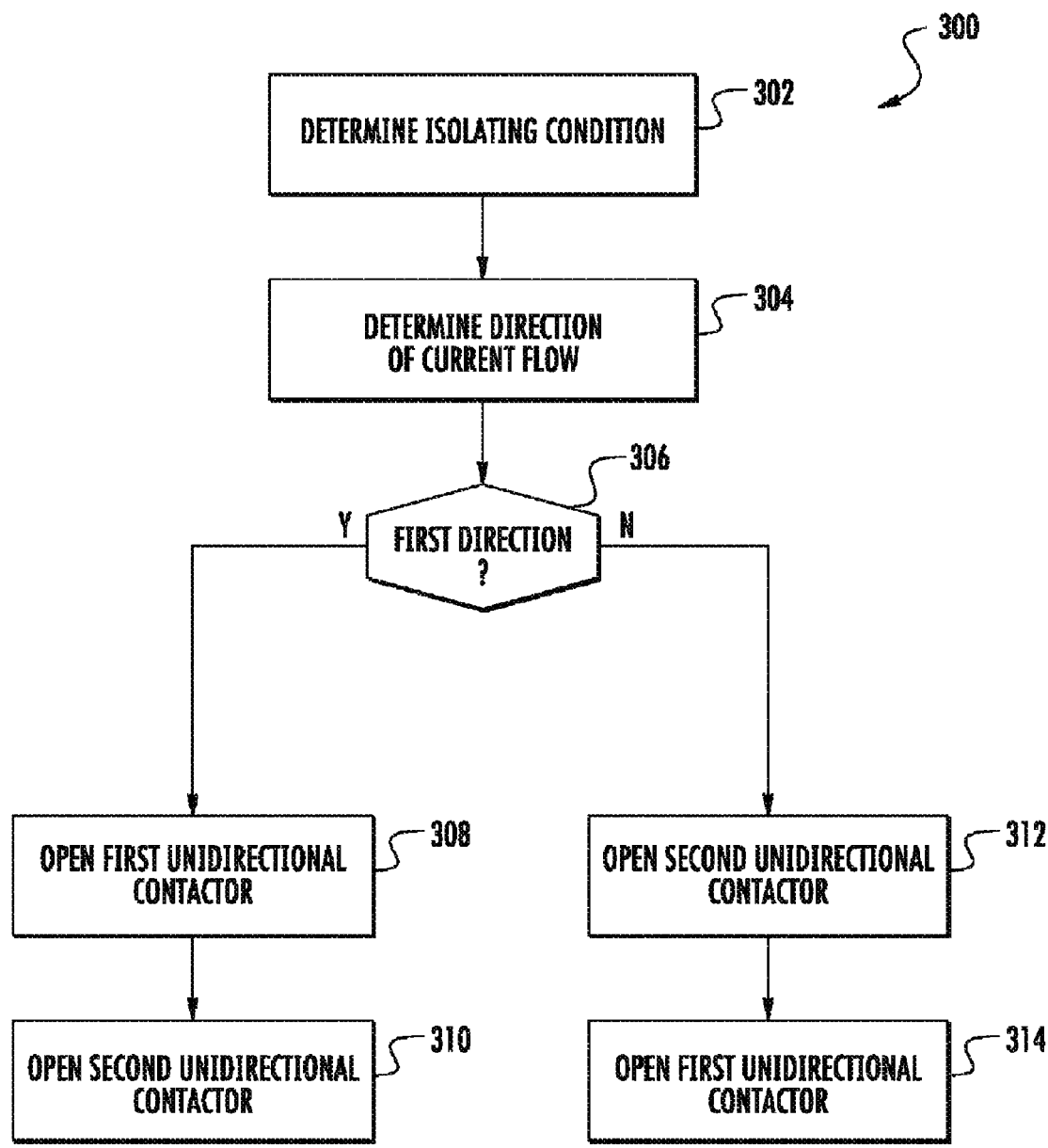
FIG. 5 depicts an example flow diagram according to example embodiments of the present disclosure.

FIG. 5 depicts a flow diagram of an example method (300) of isolating an energy storage device from a power system according to example embodiments of the present disclosure. The method (300) can be implemented by an energy storage system, such as the energy storage system described with reference to FIG. 2. In addition, FIG. 5 depicts steps performed in a particular order for purposes of illustration and discussion. Those of ordinary skill in the art, using the disclosures provided herein, will understand that the steps of any of the methods disclosed herein can be adapted, modified, rearranged, omitted and/or expanded in various ways without deviating from the scope of the present disclosure.

At (302), the method can include determining an isolating condition. An isolating condition can occur when there is a need to isolate an energy store device from a power system. In one embodiment, the isolating condition can be determined in response to a control command requesting isolation of the energy storage device for a variety of reasons, such as control of power delivery to/from the energy storage device, protection of the energy storage device, shut down or start up of the energy storage system, etc.

At (304) the direction of current flow from the energy storage device can be determined. For instance, a signal from a sensor can be received. Based on the signal, it can be determined whether current is flowing in a first direction (e.g., to the first terminal) or in a second direction (e.g., from the first terminal) relative to the energy storage device.

As shown at (306), when it is determined that current flows in the first direction (306), the method can continue to (308) where the first unidirectional contactor is opened. Once the first unidirectional contactor is opened (e.g., after a period of time), the method can continue to (310) where the second unidirectional contactor is opened.

When the current does not flow in the first direction (e.g., the current is flowing in a second direction), the method can continue to (312) where the second unidirectional contactor is opened. Once the second unidirectional contactor is opened (e.g., after a period of time), the method can continue to (314) where the first unidirectional contactor is opened.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a plurality of contactors in an energy storage system having a first unidirectional contactor coupled to a first terminal of an energy storage device and a second unidirectional contactor coupled to a second terminal of the energy storage device, the first unidirectional contactor coupled to the energy storage device with opposite polarity relative to the second unidirectional contactor, the method comprising:

determining a isolating condition for the energy storage device, the isolating condition occurring when the energy storage device needs to be electrically isolated from a power system;

responsive to determining the isolating condition for the energy storage device, determining a direction of current flow associated with the energy storage device; and controlling operation of the first unidirectional contactor and the second unidirectional contactor based at least in part on the direction of current flow associated with the energy storage device.

2. The method of claim 1, wherein when the direction of current flow is determined to be flowing in a first direction, controlling the operation of the first unidirectional contactor and the second unidirectional contactor comprises:

opening the first unidirectional contactor;

subsequent to opening the first unidirectional contactor, opening the second unidirectional contactor.

3. The method of claim 1, wherein when the direction of current flow is determined to be flowing in a second direction, controlling operation of the first unidirectional contactor and the second unidirectional contactor comprises:

opening the second unidirectional contactor; and subsequent to opening the second unidirectional contactor, opening the first unidirectional contactor.

4. The method of claim 1, wherein the first unidirectional contactor and the second unidirectional contactor are designed to accommodate opening with current flow in a single direction.

5. The method of claim 1, wherein the first unidirectional contactor is coupled to the first terminal such that the first unidirectional contactor has a first polarity and the second unidirectional contactor is coupled to the second terminal such that the second unidirectional contactor has a second polarity, the first polarity corresponding to charging the energy storage device and the second polarity corresponding to discharging the energy storage device.

6. An energy storage system, comprising:

at least one energy storage device comprising a first terminal and a second terminal;

a first unidirectional contactor coupled to the first terminal;

a second unidirectional contactor coupled to the second terminal such that a polarity of the second unidirectional contactor is opposite relative to a polarity of the first unidirectional contactor; and one or more control devices programmed to perform a control routine, the control routine comprising:

determining a isolating condition for the energy storage device, the isolating condition occurring when the energy storage device needs to be isolated from a power system;

responsive to determining the isolating condition for the energy storage device, determining a direction of current flow associated with the energy storage device; and controlling operation of the first unidirectional contactor and the second unidirectional contactor based at least in part on the direction of current flow associated with the energy storage device.

7. The energy storage system of claim 6, wherein the first unidirectional contactor and the second unidirectional contactor are designed to accommodate opening with current flow in a single direction.

8. The energy storage system of claim 6, wherein the first unidirectional contactor is coupled to the first terminal such that the first unidirectional contactor has a first polarity and the second unidirectional contactor is coupled to the second terminal such that the second unidirectional contactor has a second polarity, the first polarity being different from the second polarity.

9. The energy storage system of claim 8, wherein the first polarity corresponds to current flowing to the energy storage device and the second polarity corresponds to current flowing from the energy storage device.

10. The energy storage system of claim 6, further comprising:
a contactor drive circuit configured to operate the first unidirectional contactor and the second unidirectional contactor; and
at least one sensor configured to determine the direction of current flow associated with the at least one energy storage device;
wherein controlling operation of the first unidirectional contactor and the second unidirectional contactor comprises providing a contactor command to the contactor drive circuit based at least in part on the direction of current flow associated with the at least one energy storage device, the contactor command controlling the contactor drive circuit to open at least one of the first unidirectional contactor or the second unidirectional contactor.

11. The energy storage system of claim 10, wherein when the direction of current flow is determined to flow in a first direction, controlling operation of the first unidirectional contactor and the second unidirectional contactor comprises providing a contactor command controlling the contactor drive circuit to first open the first unidirectional contactor and to subsequently open the second unidirectional contactor to isolate the energy storage device.

12. The energy storage system of claim 11, wherein when the direction of current flow is determined to flow in a second direction, controlling operation of the first unidirectional contactor and the second unidirectional contactor comprises providing a contactor command controlling the contactor drive circuit to first open the second unidirectional contactor and to subsequently open the first unidirectional contactor to isolate the energy storage device.

13. The energy storage system of claim 6, wherein the energy storage device comprises a battery energy storage device.

14. The energy storage system of claim 13, wherein the battery energy storage device is selected from the group consisting of: a sodium nickel chloride battery, sodium sulfur battery, lithium ion battery, or nickel metal hydride battery.

15. A control system for controlling a plurality of contactors in an energy storage system having a first unidirectional contactor coupled to a first terminal of an energy storage device and a second unidirectional contactor coupled to a second terminal of the energy storage device, the first unidirectional contactor coupled to the energy storage device with opposite polarity relative to the second unidirectional contactor, the control system comprising:
a contactor drive circuit configured to operate the first unidirectional contactor and the second unidirectional contactor;
at least one sensor configured to determine the direction of current flow associated with the at least one energy storage device; and
one or more control devices configured to perform a control routine, the control routine comprising:
determining a isolating condition for the energy storage device, the isolating condition occurring when the energy storage device needs to be isolated from a power system;
responsive to determining the isolating condition for the energy storage device, determining a direction of current flow associated with the energy storage device; and
providing a contactor command controlling the contactor drive circuit to first open the first unidirectional contactor and to subsequently open the second unidirectional contactor to isolate the energy storage device.

16. The control system of claim 15, wherein the first unidirectional contactor and the second unidirectional contactor are designed to accommodate opening with current flow in a single direction.

17. The control system of claim 15, wherein the first unidirectional contactor is coupled to the first terminal such that the first unidirectional contactor has a first polarity and the second unidirectional contactor is coupled to the second terminal such that the second unidirectional contactor has a second polarity, the first polarity corresponding to current flowing to the energy storage device and the second polarity corresponding to current flowing from the energy storage device.

18. The control system of claim 15, wherein when the direction of current flow is determined to flow in a first direction, the one or more control devices configured to provide a contactor command controlling the contactor drive circuit to first open the first unidirectional contactor and to open the second unidirectional contactor after the opening of the first unidirectional contactor to isolate the energy storage device.

19. The control system of claim 18, wherein when the direction of current flow is determined to flow in a second direction, the one or more control devices configured to provide a contactor command controlling the contactor drive circuit to first open the second unidirectional contactor and to open the first unidirectional contactor after the opening of the second unidirectional contactor to isolate the energy storage device.

* * * * *